(12) United States Patent
Oh

(10) Patent No.: US 10,817,634 B2
(45) Date of Patent: Oct. 27, 2020

(54) MACHINE-LEARNING CIRCUIT OPTIMIZATION USING QUANTIZED PREDICTION FUNCTIONS

(71) Applicant: Synopsys, Inc., Mountain View, CA (US)

(72) Inventor: Nahmsuk Oh, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/248,029

(22) Filed: Jan. 15, 2019

(65) Prior Publication Data

US 2019/0228126 A1    Jul. 25, 2019

Related U.S. Application Data

(60) Provisional application No. 62/619,143, filed on Jan. 19, 2018.

(51) Int. Cl.
| | |
|---|---|
| *G06F 30/3312* | (2020.01) |
| *G06N 20/00* | (2019.01) |
| *G06F 30/398* | (2020.01) |
| *G06F 119/06* | (2020.01) |
| *G06F 119/12* | (2020.01) |

(52) U.S. Cl.
CPC ........ *G06F 30/3312* (2020.01); *G06F 30/398* (2020.01); *G06N 20/00* (2019.01); *G06F 2119/06* (2020.01); *G06F 2119/12* (2020.01)

(58) Field of Classification Search
CPC ............... G06F 30/3312; G06F 30/398; G06F 2119/06; G06F 2119/12; G06F 30/39; G06F 30/327; G06N 20/00; G06N 5/003
See application file for complete search history.

(56) References Cited

U.S. PATENT DOCUMENTS

| | | | |
|---|---|---|---|
| 6,687,887 B1 | 2/2004 | Teig et al. | |
| 6,880,138 B1 * | 4/2005 | Teig | ...................... G06F 30/367 716/115 |

(Continued)

*Primary Examiner* — Nha T Nguyen
(74) *Attorney, Agent, or Firm* — Bever, Hoffman & Harms, LLP

(57) ABSTRACT

An EDA tool trains a machine-learning optimization tool using quantized optimization solution (training) data generated by conventional optimization tools. Each training data entry includes an input vector and an associated output vector that have quantized component values respectively determined by associated operating characteristics of initial (non-optimal) and corresponding replacement (optimized) circuit portions, where each initial circuit portion is identified and replaced by the corresponding replacement circuit portion during optimization of an associated target IC design. The stored training data entries are used by the machine-learning optimization tool to generate an efficient (e.g., piecewise-linear) prediction function. During optimization of later IC designs, an input vector is generated for each selected initial circuit portion, a predicted output vector is generated for the input vector using the prediction function, and then the predicted output vector is used to identify a replacement circuit portion for the corresponding selected initial circuit portion using best-fit methodologies.

13 Claims, 11 Drawing Sheets

(56) References Cited

U.S. PATENT DOCUMENTS

| | | | | |
|---|---|---|---|---|
| 8,458,116 B2* | 6/2013 | Lupetini | ............ | G05B 13/026 |
| | | | | 706/54 |
| 8,589,855 B1* | 11/2013 | Ward | ................. | G06F 30/392 |
| | | | | 716/136 |
| 9,087,164 B2* | 7/2015 | Perry | ................. | G06F 30/00 |
| 9,792,397 B1* | 10/2017 | Nagaraja | ............ | G06F 30/3323 |
| 10,063,496 B2* | 8/2018 | Norige | ................. | H04L 41/145 |
| 10,296,691 B2* | 5/2019 | Franch | ................. | G06F 30/327 |
| 2005/0278659 A1* | 12/2005 | Zhang | ................. | G06F 30/327 |
| | | | | 716/102 |
| 2008/0071713 A1* | 3/2008 | Tung | ................. | H04B 1/1615 |
| | | | | 706/21 |
| 2008/0177487 A1* | 7/2008 | Lichtenau | ......... | G01R 31/2837 |
| | | | | 702/60 |
| 2010/0077372 A1 | 3/2010 | Xiang et al. | | |
| 2010/0083200 A1* | 4/2010 | Song | ................. | G06F 30/367 |
| | | | | 716/106 |
| 2010/0324878 A1* | 12/2010 | Lee | ................. | G06F 30/39 |
| | | | | 703/14 |
| 2015/0286766 A1* | 10/2015 | Singh | ................. | G06F 30/392 |
| | | | | 716/121 |
| 2016/0253445 A1* | 9/2016 | Pataky | ................. | G06F 30/327 |
| | | | | 716/104 |
| 2017/0220726 A1* | 8/2017 | Modi | ................. | G06F 30/398 |
| 2017/0270408 A1 | 9/2017 | Shi et al. | | |
| 2018/0005130 A1* | 1/2018 | Dong | ................. | G06N 20/00 |
| 2018/0198738 A1* | 7/2018 | Norige | ................. | H04L 49/30 |
| 2018/0203956 A1* | 7/2018 | Ng | ................. | G06F 30/327 |
| 2018/0227180 A1* | 8/2018 | Rao | ................. | G06F 15/76 |
| 2018/0300652 A1* | 10/2018 | Izumi | ............... | H03K 19/17764 |
| 2018/0307790 A1* | 10/2018 | Chuang | ................. | G06N 3/08 |
| 2018/0349795 A1* | 12/2018 | Boyle | ................. | G06F 16/9535 |
| 2019/0155575 A1* | 5/2019 | Langhammer | ........ | G06F 7/485 |

* cited by examiner $$m(S1) = \frac{dOVS1}{dIVS1} = \frac{OVA2 - OVA1}{IVA2 - IVA1}$$

MACHINE-LEARNING CIRCUIT OPTIMIZATION USING QUANTIZED PREDICTION FUNCTIONS

RELATED APPLICATIONS

This application claims priority from U.S. Provisional patent application 62/619,143, entitled "CIRCUIT POWER OPTIMIZATION USING ACTIVE MACHINE LEARNING AND QUANTIZED FUNCTIONS", which was filed on Jan. 19, 2018, and is incorporated by reference herein.

FIELD OF THE INVENTION

The present invention relates to electronic design automation (EDA) software tools utilized to develop integrated circuit (IC) designs prior to the fabrication of IC devices that are based on the IC designs. More specifically, this invention relates to optimization tools utilized by EDA software tools to optimize performance characteristics (e.g., maximum operating speed, lowest power consumption) of IC designs during development.

BACKGROUND OF THE INVENTION

Due to the ever-increasing complexity of new IC devices, Electronic Design Automation (EDA) software tools are now considered essential in the process of converting each new electronic system idea into a corresponding integrated circuit (IC) device using one or more IC "chips". That is, IC designers utilize EDA tools to develop an initial IC design (i.e., software description of the IC device) that they believe is capable of implementing a new electronic system idea, to analyze and modify the initial IC design in order to verify that the final IC design performs the operational objectives set for the electronic system idea, and then to generate and check a series of IC layouts (aka mask designs or mask layouts) that define a physical IC chip capable of implementing the final IC design. Because modern IC devices, such as System-on-Chip (SoC) devices, can comprise billions of individual circuit components, there is no practical way to develop and produce modern IC devices without the use of EDA tools.

The recent increase in the popularity of mobile electronic devices (e.g., smartphones, tablets and smartwatches) has made the power optimization functions of EDA tools extremely important. Mobile electronic devices rely on a limited supply of battery power, so the IC chip(s) utilized by mobile electronic devices are selected to provide a consumer/user with a reasonably long battery life. However, today's mobile electronic devices are being designed to execute increasingly computationally intensive software programs that, if implemented using the same IC fabrication techniques as those used in earlier products, would significantly reduce battery life (i.e., executing the new software programs using older device technology would consume battery power at significantly higher rates than that required to execute the older software, leading to undesirably short periods between required battery recharges). Because the commercial success of a given mobile device can be significantly influenced by battery life, mobile device producers are highly motivated to offset the higher power requirements of newer computationally intensive programs using more efficient IC fabrication technologies and power optimization techniques.

The increased demand for low-power-consumption IC chips has created a demand for EDA software tools that are capable of efficiently and reliably optimizing the power consumption of new IC designs in a reasonable amount of time. The power optimization portion of the IC chip development process is typically performed after IC designers have utilized development tools of a selected EDA software tool to generate an initial IC design that is capable of performing a desired function (i.e., if converted as-is to a physical IC chip using a selected IC fabrication process), and meets established constraints (e.g., maximum chip size and/or minimum operating speed). The power optimization tools of the selected EDA software tool are then utilized to optimize power consumption of the initial IC design, and then IC chips are fabricated based on the final "optimized" IC design. The conventional optimization tools implemented in the various commercially available EDA software tools utilize similar methodologies in which higher-power-consumption circuit portions are replaced with lower-power-consumption circuit portions when the replacement does not cause constraint violations in the final (optimized) IC design. For example, FIG. 11 depicts a simplified initial IC design 50-I including twelve high power cells that are arranged as shown to form three signal paths PATH 1, PATH 2 and PATH 3, and FIG. 12 depicts a cell library 55 that stores alternative cells H, M and L that may be alternatively implemented in the gate locations of initial IC design 50-I without changing the function performed by initial IC design 50-I. Note that cell H is characterized by a relatively high-power-consumption value (arbitrarily designated by the integer "3") and a low-signal-delay (high-speed) value (i.e., one), whereas cell M has a mid-range power-consumption value (two) and a mid-range signal-delay value (two), and cell L has a low-power-consumption value (one) and a high-signal-delay value (three). Referring again to FIG. 11, based on arbitrarily selected timing constraints and the use of higher-power-consumption cells H in initial IC design 50-I, PATH 1 has a timing slack of four, PATH 2 has a timing slack of six, and PATH 3 has a timing slack of five. That is, because initial IC design 50-I is formed entirely using higher-speed cells H, it exceeds the established timing constraints, but at the cost of higher power consumption (i.e., multiplying the twelve H cells by their high-power-consumption value (three) results in a TOTAL POWER consumption value for initial IC design 50-I equal to thirty-six). During an exemplary optimization process applied to initial IC design 50-I, a conventional optimization tool identifies each instance of higher-power-consumption cell circuit portion (e.g., cells H) that could be implemented using a lower-power-consumption circuit portion (e.g., cells M or L), and selects the lower-power-consumption circuit portion that minimizes (optimizes) power consumption without violating the established timing constraints. FIG. 13 depicts an exemplary final (optimized) IC design 50-F including an optimization solution in which four cells in PATH 1 are replaced with cells M, two cells in PATH 2 are replaced with cells L, and four cells in PATH 3 are replaced with three cells M and one cell L, thereby reducing power consumption of final IC design 50-F to twenty-three without violating the timing constraints applied to the three signal paths. Those skilled in the art will recognize that the example depicted with reference to FIGS. 11, 12 and 13 are greatly simplified for brevity, but that the depicted optimization process accurately represents a generalized optimization processes performed using conventional optimization tools/methods that are implemented by commercially available EDA software tools.

In the context set forth above, mobile device producers generally select an EDA software tool based on two main criteria: the ability of a given EDA software tool to reduce power consumption in a mobile device IC design in comparison to other available EDA software tools, and the amount of time required to perform the optimization process. While all conventional optimization methods utilized by commercially available EDA software tools are arguably substantially equally effective at optimizing IC designs, in each case the amount of time required to perform a power reduction/optimization process is significant due to the need to also perform a required runtime-intensive power and timing analysis (e.g., Path Based Analysis (PBA)). For example, a two-million instance central processing unit (CPU) chip with the latest node technology takes ten hours of computational time to achieve a 1% dynamic power reduction, where "instance" refers to each circuit portion (e.g., anything as simple as a transistor, resistor, or capacitor, or as complicated as an IC chip) that is referenced in a netlist description of the CPU chip.

In addition to reducing optimization processing times, there is also a need for EDA software tools that allow circuit designers to protect proprietary power conservation schemes and/or optimization solutions. That is, as set forth above, the commercial success or failure of a mobile electronic device can be determined by a small difference in battery life, so mobile electronic device producers often expend significant time and resources developing proprietary power conservation schemes and associated custom optimization solutions that give their mobile electronic devices a competitive advantage over those of their competitors. Accordingly, these mobile electronic device producers have a strong interest in maintaining (e.g., by way of trade secret) their proprietary power optimization solutions to both recover the associated development costs, and to prevent competitors from unjustly benefitting from their development efforts.

What is needed is an EDA software tool capable of effectively optimizing IC designs in significantly less time than is required using conventional optimization methods. What is also needed is an EDA software tool that allows device producers to securely develop and effectively utilize proprietary optimization techniques.

SUMMARY OF THE INVENTION

The present invention is directed to an enhanced EDA software tool and associated optimization methods that utilize a prediction function generated by active machine-learning to optimize selected operating characteristics (e.g., lower power consumption) of IC designs in substantially less time than that required using conventional optimization methods. According to an aspect of the present invention, the prediction function is generated by a machine-learning optimization tool using quantized training data entries that are collected during ongoing optimization process sessions and stored in a library. Specifically, each quantized training data entry includes an input vector and an associated output vector, with the input vector configured to operably characterize a non-optimal (initial) circuit portion that is recognized as being improvable in an unmodified (non-optimized) IC design version during an associated optimization process, and the output vector configured to operably characterize the associated final (replacement) circuit portion that is selected to replace the non-optimal (initial) circuit portion in the optimized circuit design. The machine-learning optimizing tool utilizes these training data entries to generate a prediction function that correlates the various input vector values with their corresponding output vector values, and then utilizes the prediction function to provide a predicted (estimated) output vector value for each new input vector generated for each new non-optimal/initial circuit portion of a target IC design during a subsequently performed optimization process. The predicted output vector is then utilized by the machine-learning optimizing tool to generate an optimization solution by way of identifying a best-fit replacement circuit portion from a group of alternatives having a corresponding output vector value (or other descriptor) that most closely matches the predicted output vector. Because the generation of optimization solutions using the prediction function requires substantially less processing time than that required to generate comparable optimization solutions using conventional optimization tools, the enhanced EDA software tool and optimization method of the present invention performs IC design optimization in substantially (i.e., 80% or more) less time than that that required to perform optimization of the same IC design using only conventional optimization tools.

In a presently preferred embodiment, the machine-learning optimization tool is configured to optimize (minimize) power consumption of a target IC design by way of utilizing training data entries having input vector values that operably characterize power consumption by initial (non-optimal) circuit portions of corresponding previously generated optimization solutions, and output vector values that operably characterize final power consumption of the replacement (optimizing) circuit portions of the associated previously generated optimization solutions. In order to maintain compliance with other established constraints (e.g., minimum operating speed and/or chip size/area), the input vectors also include timing-related values (e.g., slew and delay) that characterize timing-related operating characteristics of the initial circuit portion, and the output vectors include timing change values (e.g., change in slew and/or delay) that operably characterize final timing characteristics of the previously generated optimization solutions. By utilizing the power and timing component vector values provided in multiple training data entries to generate corresponding prediction functions, the machine-learning optimization tool is able to generate power optimization solutions for new IC design in substantially less time than that required to perform power optimization using conventional methods.

In a presently preferred embodiment, the generation of prediction functions is simplified using a training data merging/grouping process that involves organizing and merging large numbers of training data entries into a smaller number of training data groups, then calculating training data group values by averaging the input and output vector values of the training data entries in each training data group, and then generating the prediction function using only the training data group values. As set forth above, training data entries for each optimization solution are stored in a training data library. Even if the training data library was limited to unique training data entries (i.e., by omitting duplicate entries), the number of training data entries in a training data library may become unmanageably large (i.e., thousands) over time. Because the machine-learning optimization tool necessarily uses training data to calculate each prediction function, prediction function generation may take an impractically long time when the prediction function calculation formula is required to process unmanageably large numbers of training data entries. Accordingly, the training data merging/grouping process greatly reduces the time required for prediction function generation when the training data library stores large numbers of training data entries by way of providing the prediction function calculation formula with a relatively small number of training data group values.

In the preferred embodiments, the generation of prediction functions is further simplified by generating contiguous piecewise multidimensional planar formulas between adjacent training data group values, where the contiguous piecewise multidimensional planar formulas collectively define (form) the prediction function. Each piecewise multidimensional planar formula defines an associated linear/planar equation that generates predicted output vectors for input vector values falling within an associated effective input vector value range defined by a portion of the prediction function. The use of prediction functions defined by a sufficiently large number of piecewise multidimensional planar formulas provides a significantly reduction in the amount of processing time required to perform optimization processes without incurring a significant loss in accuracy (i.e., in comparison to prediction functions defined by more complex (e.g., curve-fitting) formulas). In a simplified exemplary embodiment, a 2D piecewise linear prediction function is generated by digitizing and merging (averaging) associated groups of training data entries that are characterized by having similar input and output vector values, and then generating contiguous piecewise one-dimensional linear formulas, which may be represented as line segments having respective linear equations (slope values) determined by coordinate changes between two endpoints, where the endpoints are defined by corresponding merged/averaged training data locations. In another exemplary embodiment, each training data entry includes an input vector having two component values, and the prediction function generated using this training data is formed by piecewise three-dimensional planar formulas configured to generate predicted output vectors for each set of two input vector values associated with each new input vector. In this case, the prediction function is generated by merging and averaging groups of quantized training data entries that have similar input vector values, and then utilizing the merged/averaged multidimensional group locations to generate corresponding piecewise planar formulas/segments that generate predicted output vectors by way of projecting the two component values of a new input vector onto a relevant section of the multidimensional planar prediction function. By merging/averaging multiple training data entries to form a relatively small number of training data locations, and by utilizing these training data locations to generate associated piecewise multidimensional planar prediction functions that include a relatively small number of contiguous segments/sections (i.e., in comparison to the number of segments/sections that would be required if every training data entry were used), the machine-learning optimization tool facilitates the generation of sufficiently accurate optimization solutions using substantially less computer processing time than would be required to implement more complex prediction functions.

In some embodiments, the input vector values and the output vector values associated with the optimization solutions generated by the machine-learning optimization tool are utilized to progressively improve the accuracy of the prediction function over time. As explained above, a current prediction function is generated at the beginning of each optimization process event using the training data entries currently stored in the training data library, then the current prediction function is utilized to generate a predicted output vector for a newly submitted input vector, and then the predicted output vector is utilized to determine a replacement circuit portion that is characterized by an associated output vector value. Upon generating the corresponding optimization solution, a new training data entry, which is made up of the newly submitted input vector and the output vector associated with the selected replacement circuit portion, is then added to the training data library. During subsequent optimization processing, the prediction function is generated in an updated form using all the data stored in the updated data library (i.e., all previously stored training data entries and the new training data entry). Accordingly, the present invention facilitates optimization of IC designs in a way that continuously evolves and improves over time by way of learning from each generated optimization solution.

In one embodiment, the enhanced EDA tool is configured for implementation in a user's secure computing system (e.g., a private network controlled by an IC device developer), whereby development of the prediction function is controllable by the user to optimize new IC designs in accordance with the user's preferred and/or proprietary (e.g., trade secret) optimization strategies. In this case, the enhanced EDA tool includes both a conventional optimization tool and the machine-learning optimization tool. The conventional optimization tool is utilized to generate optimization solutions whenever the machine-learning optimization tool determines that the prediction function cannot provide a sufficiently accurate optimization solution (e.g., when the enhanced EDA tool is initially utilized and the training data library is relatively empty, or whenever a new input vector falls significantly outside the effective range of the currently existing prediction function), and may also be utilized using known techniques to implement user-specified preferred/proprietary optimization solutions. The preferred/proprietary optimization solutions generated by the conventional optimization tool are converted and stored as corresponding training data entries in the manner described above. Accordingly, the prediction function subsequently generated by the machine-learning optimization tool is uniquely characterized (i.e., effectively "taught") by the preferred/proprietary optimization solutions such that predicted output vectors generated for subsequently submitted input vectors are biased toward replacement circuit portions that are consistent with the user' preferred/proprietary optimization strategy. In addition to the above-mentioned commercial advantages stemming from significantly shorter optimization processing times, because development of each uniquely-characterized prediction function is entirely performed within a user's secure computer system/network, the user is also able to prevent competitors from unjustifiably benefitting from the time and resource invest spent by the user on developing the user' proprietary optimization strategy.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improved EDA software tool and associated methods for use during the development of IC (circuit) designs that are subsequently utilized in the fabrication of physical IC devices (chips) based on the circuit designs. The figures and the following detailed description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The figures and detailed description may also signify, implicitly or explicitly, advantages and improvements of a subset of the exemplary embodiments described herein. In the figures and detailed description, numerous specific details may be described to provide a thorough understanding of one or more of the exemplary embodiments. In the interest of not obscuring the presentation of embodiments of the claimed inventions, in the following detailed description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

Figure 1:
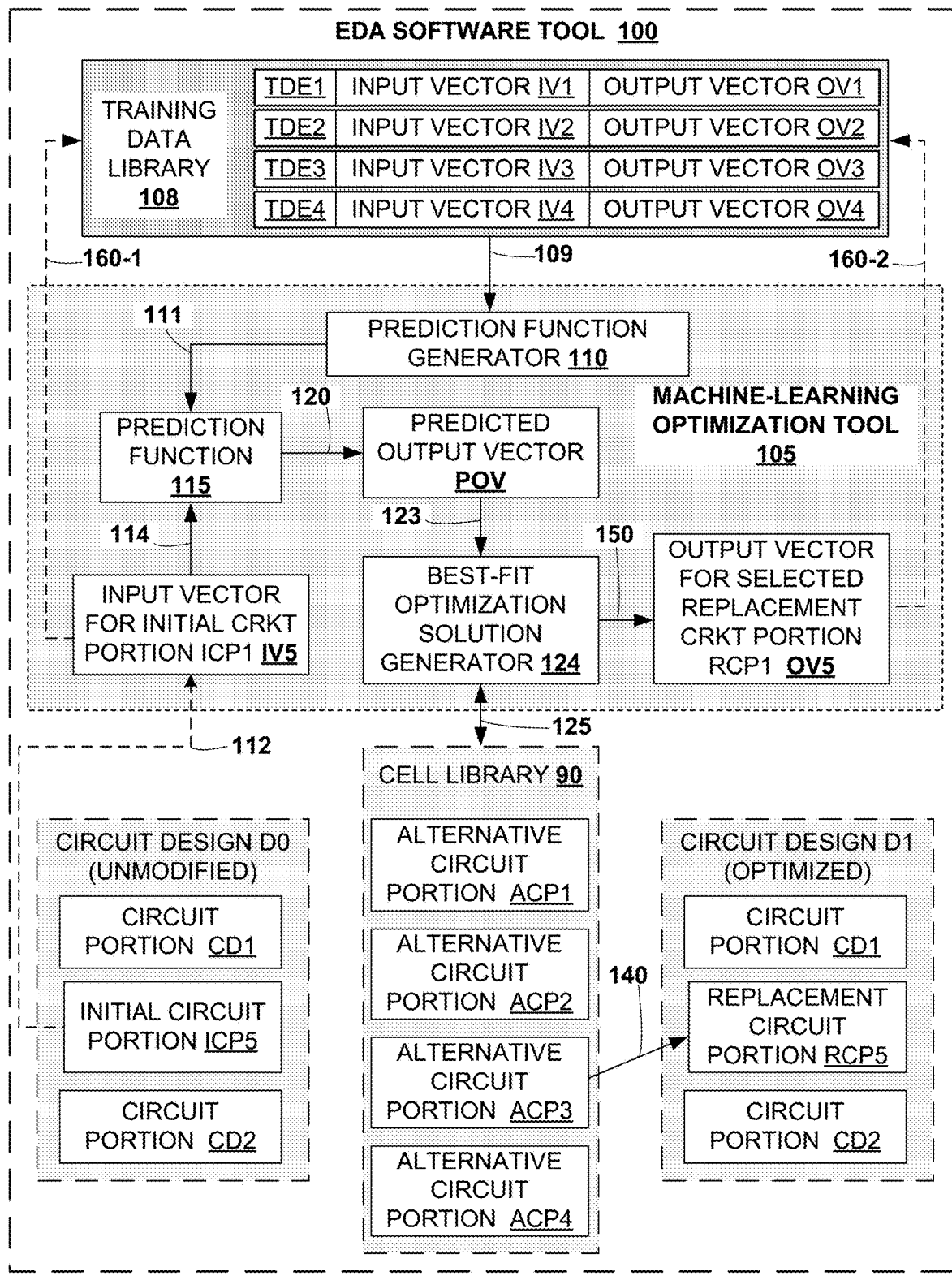
FIG. 1 is simplified block diagram showing an EDA software tool including a machine-learning optimization tool according to an embodiment of the present invention.

FIG. 1 shows a greatly simplified EDA software tool 100 including a machine-learning optimization tool 105 configured in accordance with a generalized embodiment of the present invention to optimize IC designs. Machine-learning optimization tool 105 is depicted in a flow diagram format to emphasize the novel optimization methodology performed by EDA software tool 100 when executed by the processor of a computer (not shown). As used herein, the phrase "machine-learning optimization tool" refers to an optimization software toolset utilized by EDA tools to perform optimization of IC designs, and is distinguished from conventional optimization tools by way of implementing any known machine-learning algorithm (e.g., linear regression, decision tree, or artificial neural network). Note that other portions of EDA software tool 100 are omitted from FIG. 1 for clarity, such as tools associated with the circuit development process described below with reference to FIG. 9. Note also that the phrase "IC design" and references to circuit portions of IC designs refer to electronically stored circuit designs that may be converted into corresponding physical devices, for example, using fabrication process flow described below with reference to FIG. 9.

Referring to the upper portion of FIG. 1, EDA tool 100 includes a training data library 108 configured to receive and store quantized training data entries that are utilized by machine-learning optimization tool 105 in the manner described below. In FIG. 1, training data library 108 is depicted as storing four quantized training data entries TDE1 to TDE4 for brevity; that is, any number of training data entries may be stored in training data library 108 and used by machine-learning optimization tool 105 to generate a prediction function.

According to an aspect of the present invention, quantized training data entries TDE1 to TDE4 respectively include data that operably describes previously generated optimization solutions involving the replacement of an initial circuit portion in an unmodified (non-optimal) IC design with a replacement circuit portion in a modified (optimized) version of the IC design. In one embodiment, quantized training data entry TDE1 to TDE4 utilize input vectors IV1 to IV4 to operably characterize the initial circuit portions of associated previously generated optimization solutions, and output vectors OV1 to OV4 to operably characterize corresponding replacement circuit portions of the associated previously generated optimization solutions. As explained below, the use of these input and output vectors facilitates utilizing the previously generated optimization solutions to generate a prediction function capable of accurately predicting replacement circuit portions during subsequent optimization processes involving newly formed IC designs.

Figure 2:
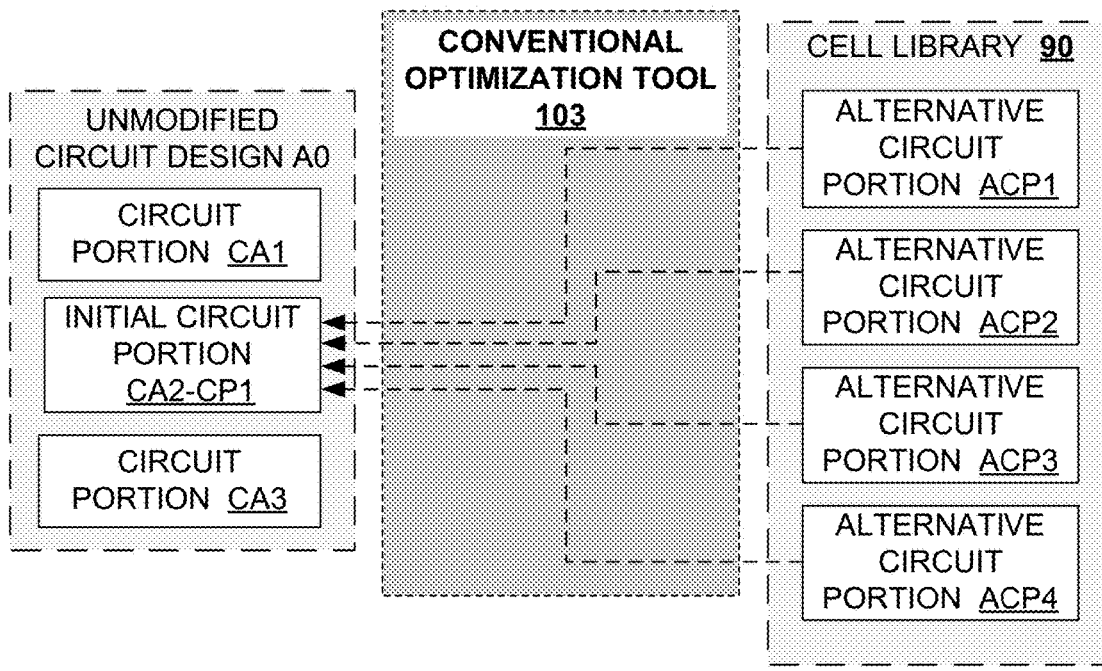
FIG. 2 is simplified block diagram depicting the generation of an optimization solution by a conventional optimization tool during the generation of training data according to an exemplary embodiment.
Figure 3:
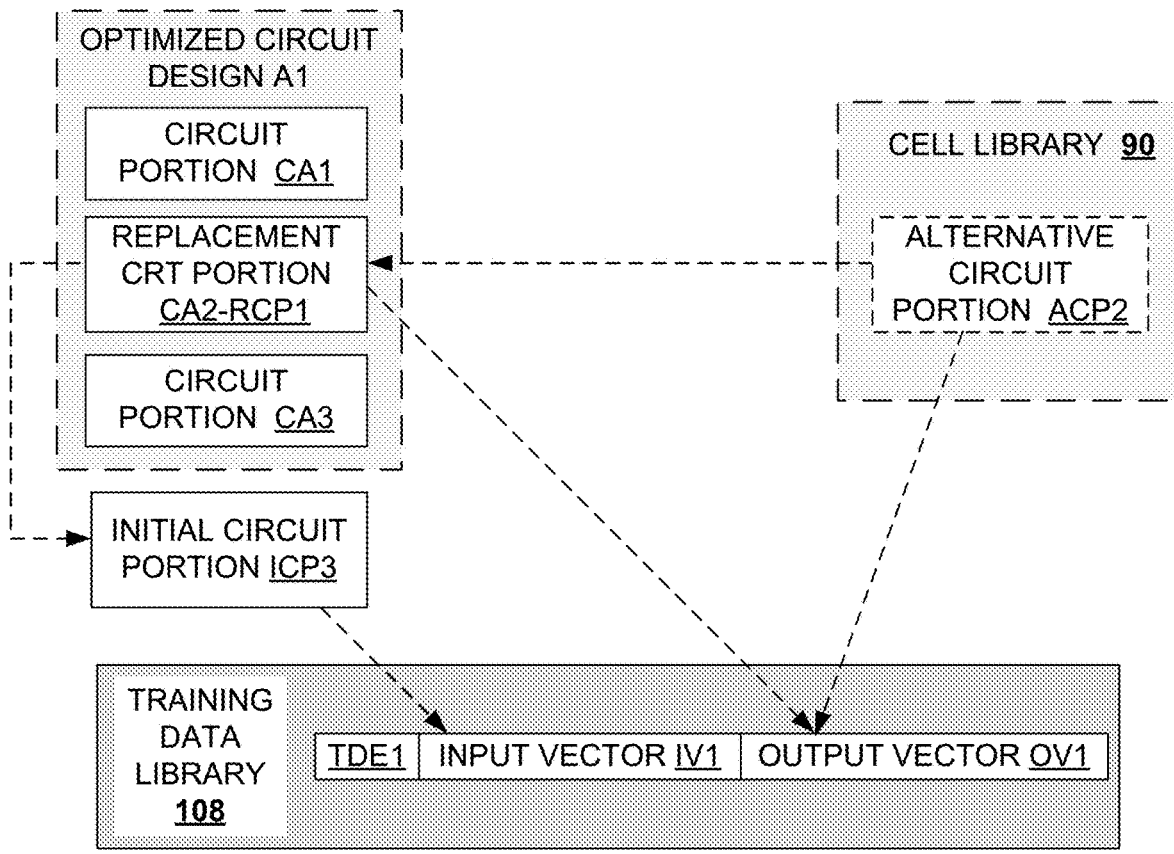
FIG. 3 is simplified block diagram depicting the generation of a training data entry using the optimization solution depicted in FIG. 2 according to an exemplary embodiment.

The content of training data entries TDE1 to TDE4, which are stored in training data library 108 (FIG. 1), will now be described with reference to FIGS. 2 and 3 by way of providing a simplified example showing the generation of training data entry TDE1 during a previously performed optimization process performed during the development of an IC design A. As mentioned above, training data entry TDE1 is generated using data describing a single optimization solution of the previously performed optimization process in which an initial circuit portion ICP1 of an unmodified (non-optimal) IC design A0 (FIG. 2) is replaced by a conventional optimization tool 103 with a replacement circuit portion RCP1 in a modified (optimized) IC design A1 (FIG. 3), where "A0" and "A1" represent slightly different versions of IC design A. Referring to FIG. 2, unmodified (non-optimal) IC design A0 includes many circuit portions represented for brevity by circuit portions CA1, CA2 and CA3, where circuit portion CA2 is identified by conventional optimization tool 103 (i.e., using known techniques) as being non-optimal, and is therefore designated as initial circuit portion ICP1 (i.e., the circuit portion to be replaced). As also indicated in FIG. 2, the replacement of initial circuit portion ICP1 typically involves a selection by conventional optimization tool 103 of one of several alternative circuit portions (e.g., alternative circuit portions ACP1 to ACP4), which are typically stored in a standard cell or other cell library 90. As indicated in FIG. 3, for descriptive purposes it is assumed conventional optimization tool 103 selects alternative circuit portion ACP2 using known techniques to serve as replacement circuit portion RCP1 in optimized IC design A1, whereby initial circuit portion ICP1 is effectively removed and replaced by alternative circuit portion ACP2. Note that other circuit portions (e.g., portions CA1 and CA3) remain unchanged from unmodified IC design A0 to optimized IC design A1). It is understood that the optimization solution generated by the replacement of initial circuit portion ICP1 with replacement circuit portion RCP1 generates an improved operating characteristic (e.g., lower power consumption) of optimized IC design A1 with respect to unmodified IC design A0, and that the selection of initial circuit portion ICP1 and replacement circuit portion RCP1 by conventional optimization tool 103 is performed using techniques known in the art. Referring to the lower portion of FIG. 3, training data entry TDE1 includes input vector IV1 including (first) input vector values that operably characterize initial circuit portion ICP1 of the previously generated optimization solution, and output vector OV1 including one or more (first) output vector values that operably characterize corresponding replacement circuit portion RCPT of the previously generated optimization solution. Referring again to the top of FIG. 1, training data entries TDE2, TDE3 and TDE4 are generated in the same way as that of training data entry TDE1 in accordance with corresponding previously performed optimization solutions generated during one or more optimization processes.

Referring again to FIG. 1, machine-learning optimization tool 105 includes a prediction function generator 110 configured to generate a prediction function 115 using quantized training data entries TDE1 to TDE4, and then utilizes prediction function 115 to generate predicted output vectors for newly-identified initial circuit portions by way of applying input vectors describing the newly-identified initial circuit portions to prediction function 115. The generation of a predicted output vector by prediction function 115 is generally described with reference to a current optimization process performed by machine-learning optimization tool 105 and involving a target (new and unmodified) IC design D0, which is depicted in the lower left portion of FIG. 1. In the manner described above with reference to the generation of training data entry TDE1 (FIG. 1), an initial circuit portion ICP5 of IC design D0 is identified for replacement using known optimization techniques, and an input vector IV5 that operably characterizes initial circuit portion ICP5 is applied to prediction function 115. In alternative embodiments, input vector IV5 is either generated by machine-learning optimizing tool 105, or input vector IV5 is included with the description of initial circuit portion ICP5 and transferred to machine-learning optimizing tool 105 (e.g., as indicated by arrow 112). In either case, input vector IV5 is applied to (i.e., entered into) prediction function 115 as indicated by arrow 114, and prediction function 115 generates a predicted output vector POV (e.g., indicated by arrow 120) having output vector values that are determined by the quantized input values of input vector IV5. Predicted output vector POV is then utilized to select a replacement circuit portion RCP5 for initial circuit portion ICP5 by way of comparing predicted output vector POV with output vectors that respectively operably describe possible replacement circuit portions, and identifying the output vector that most closely matches predicted output vector POV. In the example depicted at the bottom of FIG. 1, machine-learning optimizing tool 105 utilizes a best-fit solution generator 124 to compare (as indicated by arrow 125) predicted output vector POV with output vectors (not shown) that operably describe alternative circuit portions ACP1 to ACP4, which are stored in cell library 90 as described above. In this example, the output vector associated with alternative circuit portion ACP3 is identified as being most closely matched with predicted output vector POV, whereby target/optimized IC design D1 is updated, as indicated by arrow 140, by utilizing alternative circuit portion ACP3 to replace initial circuit portion ICP5 (i.e., alternative circuit portion ACP3 is used as replacement circuit portion RCP5 in modified/optimized IC design D1).

Referring again to FIG. 1, the methodology performed by machine-learning optimization tool 105 also includes updating training data library 108 to include a new (second) training data entry formed at least in part by an input vector that operably characterizes initial circuit portion ICP5 and an output vector that operably characterizes replacement circuit portion RCP5. In one embodiment this new training data entry is formed by transmitting input vector IV5 to training data library 108 (e.g., as indicated by dashed-line arrow 160-1), and by configuring best-fit optimization solution generator 124 to generate an output vector that describe alternative circuit portion ACP3 (as indicated by arrow 150), and then transmitting output vector OV5 to training data library 108 (e.g., as indicated by dashed-line arrow 160-2). Updating training data library 108 with each new optimization solution generated by machine-learning optimization tool 105 facilitates a potential further reduction in processing time by further enhancing the ability of the resulting periodically-updated prediction function to accurately identify optimal replacements for each new initial circuit portion.

Figure 4A:
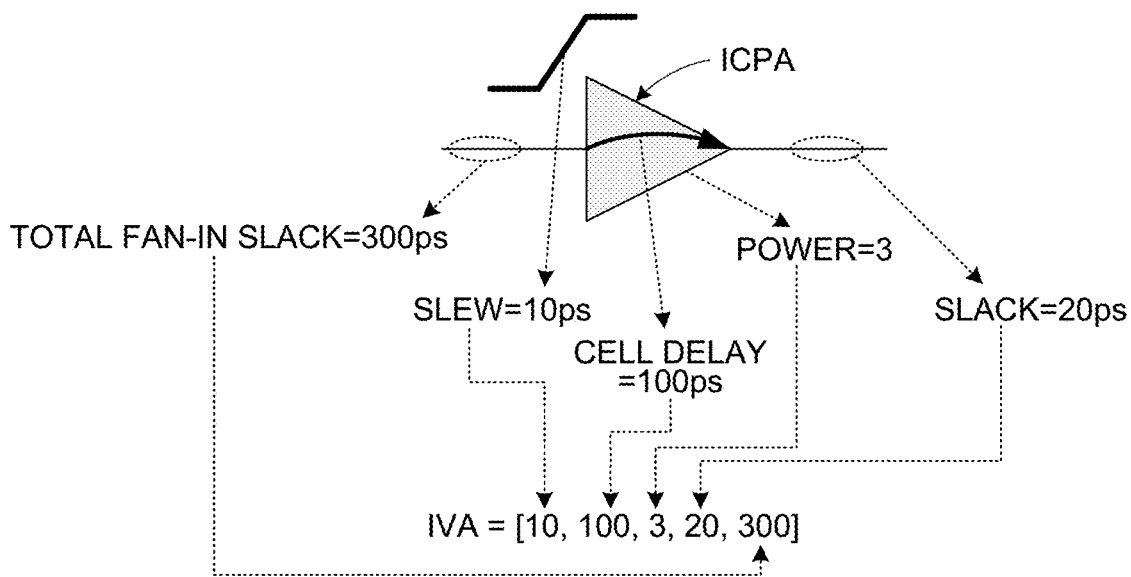
FIGS. 4A and 4B are diagrams respectively depicting an initial circuit portion and associated input vector, and an associated replacement circuit portion and an associated output vector, wherein the initial and replacement circuit portions correspond to an exemplary power optimization solution and an associated training data entry generated thereby.
Figure 4B:
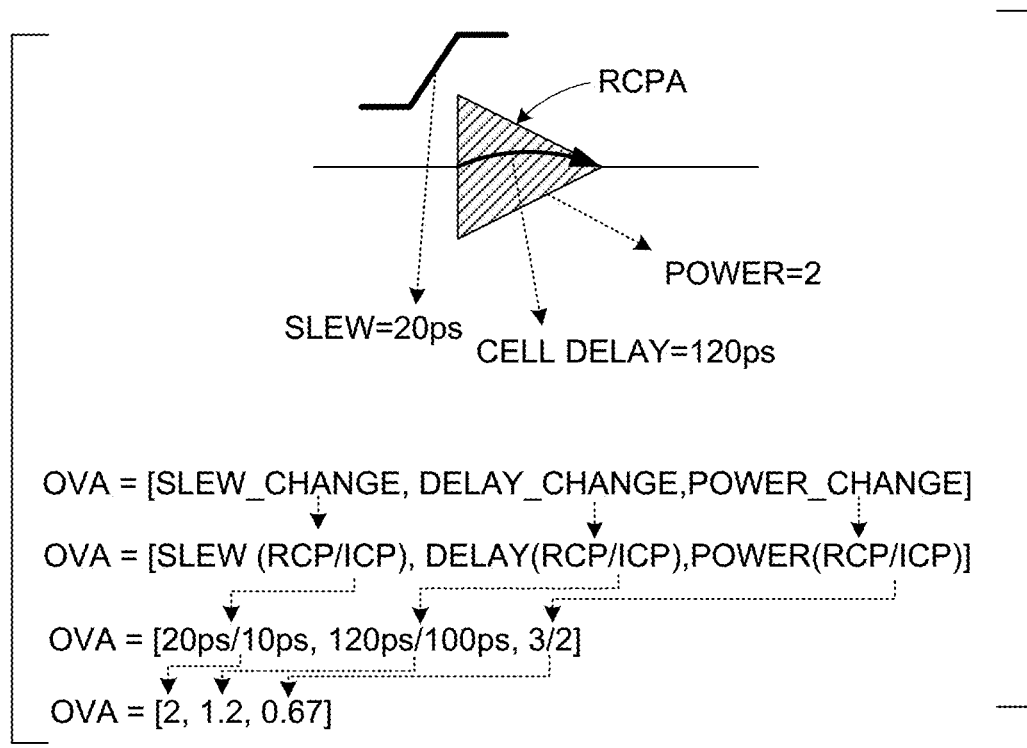

FIGS. 4A and 4B are diagrams respectively depicting the generation of an exemplary input vector and an associated output vector according to a specific power optimization embodiment of the present invention. Specifically, FIG. 4A depicts an initial circuit element (e.g., buffer or gate) ICPA along with an associated input vector IVA made up of input vector values that operably characterize power consumption and timing operating characteristics of initial circuit element ICPA, and FIG. 4B depicts a replacement circuit element RCPA along with an associated output vector OVA that operably characterizes power consumption and timing operating characteristics associated with the use of replacement circuit element RCPA. Referring to FIG. 4A, the (first) input vector values of input vector IVA include an initial power consumption value POWER that operably characterizes power consumption by initial circuit portion ICPA, and also include various timing related values including a slew value SLEW that quantifies (operably characterizes) a slew rate of initial circuit portion ICPA, and a cell delay value CELL DELAY that quantifies a signal delay period caused by passing a signal through initial circuit portion ICPA. Input vector IVA may also include additional timing values related to the circuit environment in which initial circuit portion ICPA is placed, such as a total fan-in slack value and an output slack value, which are determined by user-defined timing constraints that must be satisfied by the selected optimization solution. Referring to FIG. 4B, the (first) output vector values of output vector OVA include a power change value (POWER_CHANGE) that indicates a power improvement achieved by replacing initial circuit portion ICPA with replacement circuit portion RCPA in a target circuit design (e.g., in the form of a ratio of replacement-to-initial power consumption), whereby the power change value operably characterizes the (final) power consumption by RCPA. In one embodiment, output vector OVA also includes additional timing-related output vector values that operably characterize final timing characteristics achieved by replacing initial circuit portion ICPA with replacement circuit portion RCPA in a target circuit design, such as a slew change value (SLEW_CHANGE) and a delay change value (DELAY_CHANGE) that are calculated as replacement/initial slew/delay ratios. Note that input vector IVA and output vector OVA are intended as greatly simplified examples that are not intended to be limiting, and that those skilled in the art will recognize that practical input and output vectors may include any number of vector values.

According to an embodiment, when the training data library contains a large number of training data entries, the training data entries are organized into groups and merged to simplify the prediction function generation process. Specifically, this training data merging/grouping process involves organizing large numbers of training data entries into a smaller number of training data groups, calculating average input and output vector values for each training data group using the input/output vector values of the training data entries in each group, and then calculating the prediction function using the average input/output vector values of the training data groups. This training data merging/grouping process and the associated simplified generation of prediction functions is explained in additional detail below with reference to a first simplified exemplary embodiment depicted in FIGS. 5A to 5E, and with reference to a second simplified exemplary embodiment depicted in FIGS. 6A to 6D. The first simplified exemplary embodiment involves the generation and use of a piecewise linear prediction function that involves merging/grouping training data entries that have one-dimension input vector values and one-dimensional output vector values. The second simplified exemplary embodiment involves the generation and use of a piecewise planar prediction function formed by way of merging/grouping training data entries that have two-dimension input vector values and one-dimensional output vector values. By logical extension of the approaches described with reference to the piecewise linear and planar examples, those skilled in the art will understand that the training data merging/grouping process may be utilized to generate prediction functions made up of piecewise N-dimensional planar formulas (i.e., where N represents any integer greater than one), with each piecewise N-dimensional planar formula forming a corresponding portion of the prediction function and having endpoints/boundaries defined by associated training data group values. In other embodiments, the training data merging/grouping process may be utilized to simplify the generation of prediction functions defined by more complex (e.g., curve-fitting) formulas.

Figure 5A:
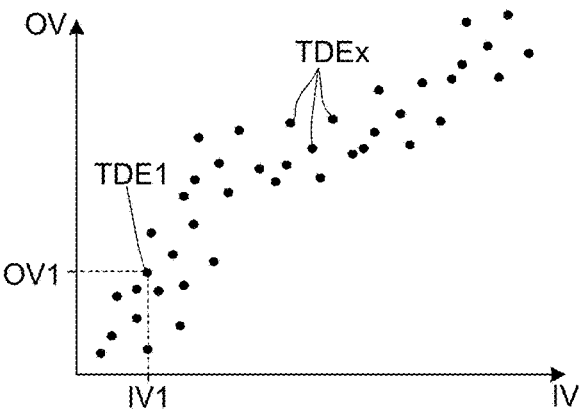
FIGS. 5A, 5B, 5C, 5D and 5E are graphs depicting the formation of a prediction function including contiguous piecewise linear formulas according to a simplified exemplary embodiment.

FIGS. 5A to 5E depict the generation of a piecewise linear prediction function 115A according to a first exemplary embodiment. FIG. 5A is a graph depicting digitized training data entries TDEx, where the location of each training data entry TDEx in the graph is determined by an associated one-dimensional input vector value plotted relative to a horizontal input vector axis IV and an associated one-dimensional output vector value plotted relative to a vertical output vector axis OV. For example, the location of digitized training data entry TDE1 is determined by its associated input vector value IV1, which is indicated on input vector axis IV, and by its associated output vector value OV1, which is indicated on output vector axis OV. As described above, the input vector value of each training data entry TDEx quantizes an associated initial circuit portion that was replaced in a given previously generated optimization solution, and the output vector value of each training data entry TDEx quantizes the replacement circuit portion utilized to replace the associated initial circuit portion of the given previously generated optimization solution.

Figure 5B:
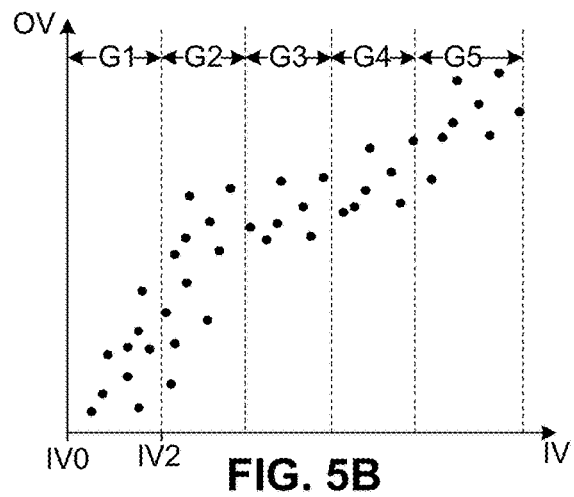

FIG. 5B depicts the organization of training data values TDEx into five groups G1 to G5 such that each group includes multiple training data values having similar input vector values. For example, group G1 includes approximately ten training data values TDEx that have input vector values in the range between value IV0 and value IV2. Note that the number of groups (i.e., five) and the range of input vector values included in each group G1 to G5 of FIG. 5B are arbitrarily selected for descriptive purposes.

Figure 5C:
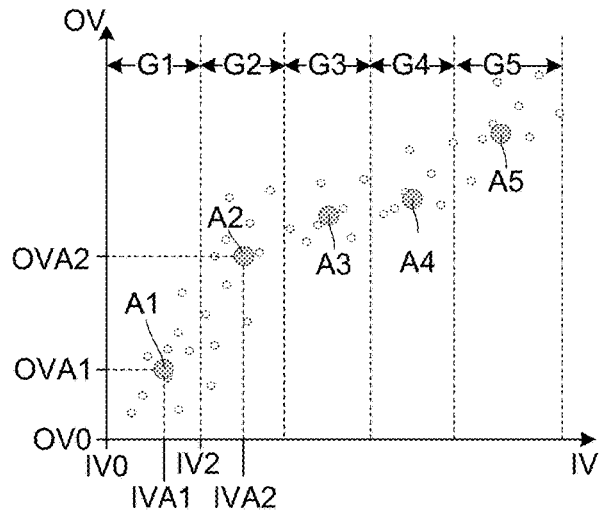

FIG. 5C depicts the formation of training data group values A1 to A5, where the position of each training data group value A1 to A5 is determined by averaging the input and output vector values of the training data entries in each group G1 to G5, respectively. For example, the horizontal position of training data group value A1 is determined by an average input vector group value IVA1 and the vertical location of training data group value A1 is determined by an average output data group value OVA1. Average input vector group value IVA1 is calculated by summing the input vector values of each training data entry in group G1, which are indicated by the dots located between value IV0 and value IV2, and then dividing this sum by the number of training data entries in group G1. Similarly, average output vector group value OVA1 is calculated by summing the output vector values of each training data value in group G1 and dividing by the number of training data entries in group G1. Training data group values A2 to A5 are indicated by corresponding ovals located at horizontal/vertical locations that corresponding to averages of the horizontal/vertical locations of all training data entries located within the boundaries of groups G2 to G5, respectively.

Figure 5D:
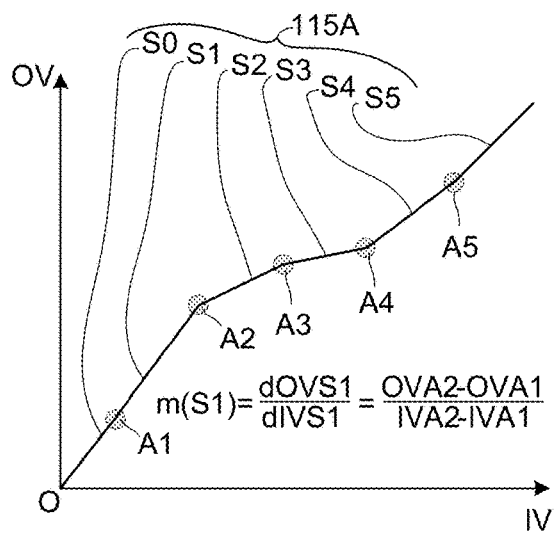

FIG. 5D depicts the formation of a piecewise linear prediction function 115A made up of contiguous piecewise (two-dimensional) linear formulas (i.e., prediction function portions) that are graphically depicted in FIG. 5D by contiguous line segments S1 to S4. Linear formulas f(S1) to f(S4) (i.e., the functions represented by line segments S1 to S4, respectively) have associated effective ranges defined by endpoints corresponding to an associated pair of training data group values A1 to A5. That is, each formula represented by an associated line segment S1 to S4 generates a predicted output vector value for applied input vector values that fall within an associated range defined by the segment's corresponding end points. For example, segment S1 depicts a linear formula f(S1) having an effective range that extends between training data group values (endpoints) A1 and A2, whereby linear formula f(S1) provides predicted output vectors for input vector values falling within the range between input vector value IVA1 and input vector value IVA2, where input vector values IVA1 and IVA2 are the component input vector values of training data group values A1 and A2, respectively. Similarly, segment S2 represents a second linear formula f(S2) that generates a predicted output vector for each input vector value within the range between the component input vector values of training data group values A2 and A3, segment S3 represents a third linear formula f(S3) that generates predicted output vectors for input vector values within the component input vector value range of training data group values A3 and A4, and segment S4 represents a fourth linear formula f(S4) that generates predicted output vectors for input vector values within the component input vector value range of training data group values A4 and A5. In one embodiment, each linear formula f(S1) to f(S4) includes an associated slope defined by the difference between associated component output vector values divided by the difference between associated component input vector values of the two end points. For example, as indicated in FIG. 5D, linear formula f(S1) includes a slope m(S1) that is calculated using a component output vector value difference dOVS1 divided by a component input vector value difference dIVS1, with component output vector value difference dOVS1 equal to the output vector component value OVA2 defined at endpoint A2 minus the output vector component value OVA1 defined at output vector group value (endpoint) A1, and component input vector value difference dIVS1 equal to the input vector component value IVA2 defined at endpoint A2 minus the input vector component value IVA1 defined at endpoint A1. Piecewise linear formulas f(S2) to f(S4) have corresponding slopes determined in a similar manner using component input/output vector values defined by associated endpoints A2 to A5. As set forth below, when a machine-learning optimization tool utilizes piecewise linear prediction function 115A to generate a predicted output vector for a new input vector value, the tool identifies the relevant piecewise linear formula f(S1) to f(S4) (i.e., the formula having an effective range that encompasses the new input vector value), and then applies the new input vector value only to that linear formula to generate the desired predicted output vector value.

In one embodiment, piecewise linear prediction function 115D is further enhanced to include additional "boundary" linear formulas/functions f(S0) and f(S5), which are depicted in FIG. 5D as segments S0 and S5. That is, the training data values located outside the outer boundaries of training data group locations A1 to A5 (i.e., to the left of location A1 and to the right of location A5 in FIG. 5D) may be used to expand the range of piecewise linear prediction function 115A using extrapolation techniques known in the art, although it is understood that resulting boundary linear formulas f(S0) and f(S5) may not be as accurate as piecewise linear formulas f(S1) to f(S4). Accordingly, in one embodiment, the machine-learning optimization tool implementing a piecewise linear prediction function similar to prediction function 115A may be configured to notify the user whenever a new input vector value falls within the range associated with boundary linear formula.

Figure 5E:
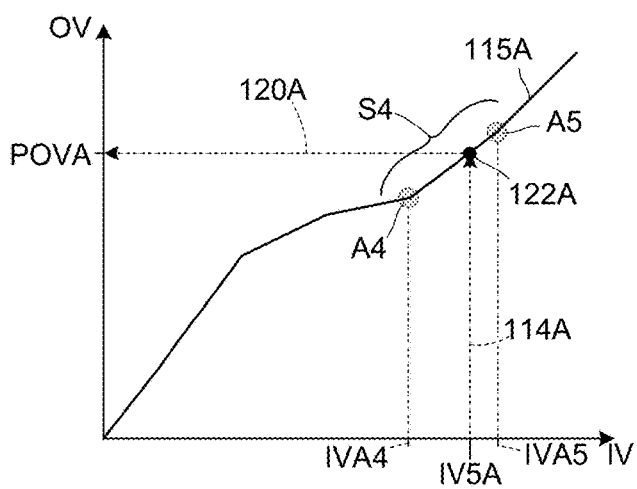

FIG. 5E depicts an exemplary use of piecewise linear prediction function 115A to generate a predicted output vector value POVA for an exemplary input vector value IV5A that falls between component input vector values IVA4 and IVA5, which in turn are defined by endpoints A4 and A5. Because vector value IV5A is between endpoints IVA4 and IVA5, the machine-learning optimization tool utilizes the slope and endpoints of piecewise linear formula f(S4) to calculate predicted output vector value POVA, for example, using calculation techniques that are consistent with the graphic representation depicted in FIG. 5E. Specifically, input vector value IV5A is projected vertically upward (e.g., along arrow 114A) from the associated position on input vector value axis IV to a corresponding intersection point 122A defined by line segment S4, and then projecting horizontally (e.g., along arrow 120A) from the intersection point 122A to a corresponding position on output vector axis OV. By merging/averaging multiple training data entries to form training data locations A1 to A5, and by utilizing training data locations A1 to A5 to generate associated piecewise linear prediction function 115A that include a relatively small number of contiguous segments (linear formulas), the present invention facilitates the generation of sufficiently accurate optimization solutions using substantially less computer processing time than would be required to implement more complex prediction functions.

Figure 6A:
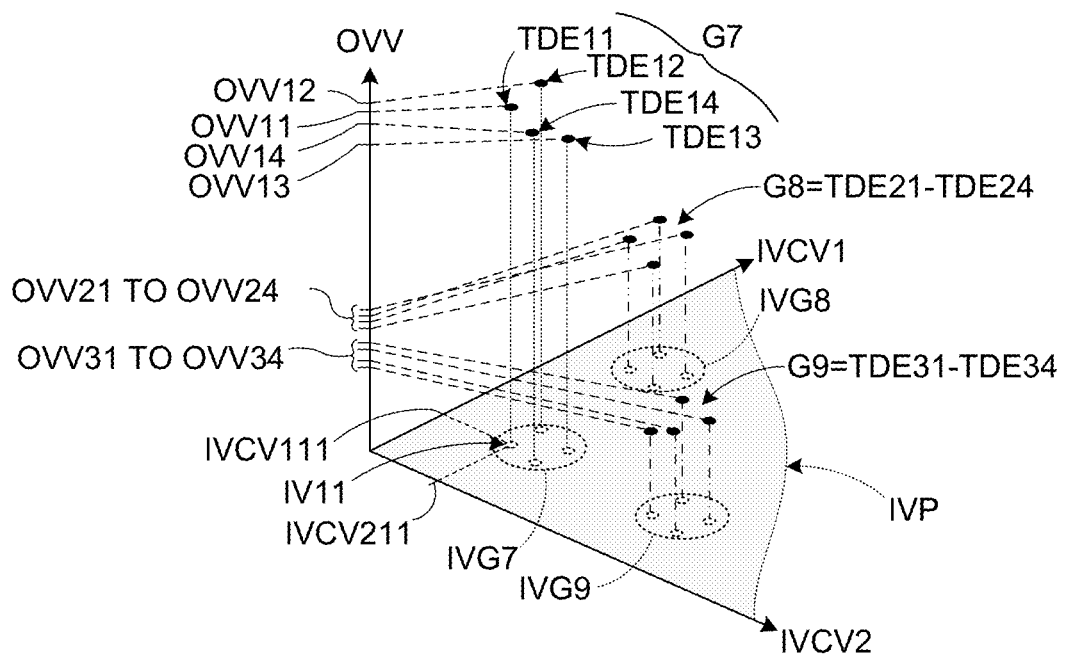
FIGS. 6A, 6B, 6C and 6D are simplified perspective views showing the generation of a piecewise planar prediction function according to another exemplary embodiment.
Figure 6B:
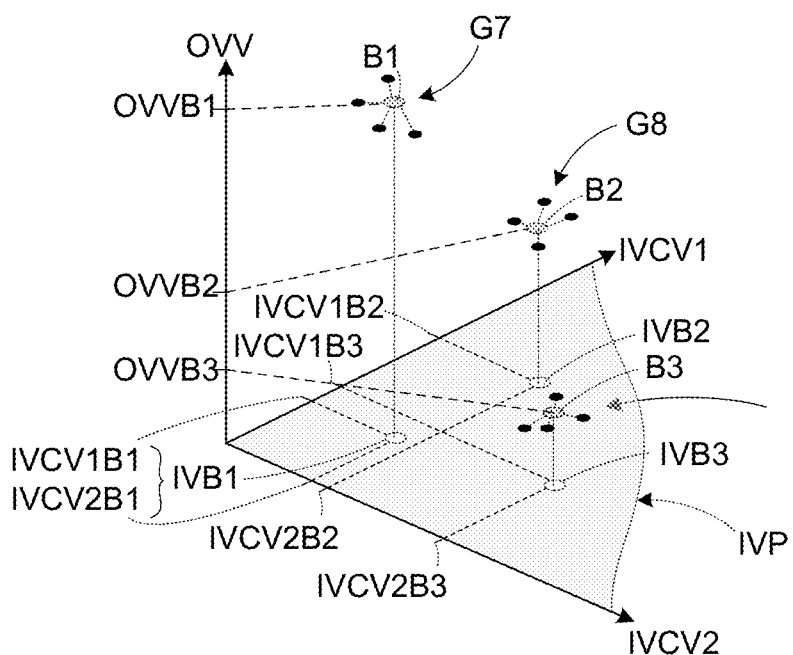
Figure 6C:
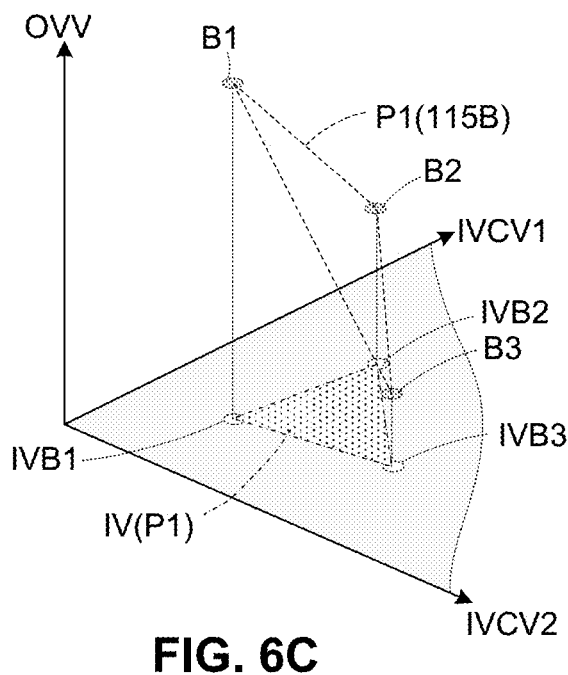

FIGS. 6A to 6D depict the generation of a simplified piecewise planar prediction function 115B according to another exemplary embodiment of the present invention. The process utilized to generate piecewise planar prediction function 115B is similar to the generation of piecewise linear prediction function 115A, which is described above with reference to FIGS. 5A to 5E, in that it involves combining training data entries that have similar input vector values into training data groups as depicted in FIG. 6A, calculating average group vector values using the training data values in each training data group as depicted in FIG. 6B, and then generating one or more multidimensional planar formulas/segments between the average group vector values as depicted in FIG. 6C. Although piecewise planar prediction function 115B is described below with reference to a single planar formula/segment for purposes of clarity and brevity, those skilled in the art will recognize that the techniques described below may be extended to provide prediction function 115B with additional contiguous piecewise planar formulas/sections (e.g., analogous to multiple piecewise linear formulas represented by sections S1 to S4 in FIG. 5D and as described above). In addition, although piecewise multidimensional planar prediction functions are described below with reference to three-dimension planar formulas for brevity and clarity, those skilled in the art will understand that the techniques described with reference to example provided below may be extended to additional dimensions without detracting from the spirit and scope of the present invention. Accordingly, the simplified exemplary embodiment described with reference to FIGS. 6A to 6D is understood as not being limiting to the appended claims unless specifically specified.

FIG. 6A shows a three-dimensional graph in which the locations of training data entries TDE11 to TDE34 are determined by two-dimensional input vector values (i.e., input vector values having two component values that determine each training data entry's horizontally-oriented location relative to input vector component value axes IVCV1 and IVCV2), and a single-dimension output vector value that determines each training data entry's vertically-oriented location relative to output vector value axis OVV.

For example, training data entry TDE11 is located such that its input vector forms a projection IV11 on an input vector plane IVP at a location IVCV111 along input vector component value axis IVCV1 and at a location IVCV211 along input vector component value axis IVCV2, and such that its output vector intersects output vector value axis OVV at a point OVV11. The remaining training data entries TDE12 to TDE14, TDE21 to TDE24 and TDE31 to TDE34 are similarly located such that their input vectors form corresponding projections on input vector plane IVP, and such that their output vectors intersect output vector value axis OVV at corresponding vertical locations OVV12 to OVV14, OVV21 to OVV24 and OVV31 to OVV34.

As also indicated in FIG. 6A, training data entries having similar input vector values are collected into training data groups G7 to G9, with each group including training data entries having input vector values that are similar in the two dimensions. Specifically, group G7 includes training data entries TDE11 to TDE14, which have respective input vector values that are similar by way of residing within a relatively small region IVG7 of input vector plane IVP. Similarly, group G8 includes training data entries TDE2l to TDE24 having respective input vector values that project into region IVG8 of input vector plane IVP, and group G9 includes training data entries TDE31 to TDE34 having respective input vector values that project into region IVG9 of input vector plane IVP.

FIG. 6B depicts the generation (calculation) of training data group values B1 to B3 by way of merging the training data values in each group G7 to G9 using techniques similar to those described above with reference to the generation of training data locations A1 to A5. Specifically, the training data values of group G7 are merged to form training data group value B1, the training data values of group G8 are merged to form training data group value B2, and the training data values of group G9 are merged to form training data group value B3. Note that the two-dimensional input vector component values that determine the averaged locations of training data group values B1 to B3 are indicated on input vector plane IVP using vertical projections IVB1, IVB2 and IVB3, and the output vector values of each training data group value B1 to B3 is indicated by a corresponding horizontal projection onto output vector value axis OVV. For example, vertical projection IVB1 indicates that training data group value B1 is located at input vector component values IVCV1B1 and IVCV2B1 along input vector component value axes IVCV1 and IVCV2, and the horizontal projection from training data group value B1 indicates an output vector value of OVVB1. In a similar manner, training data group value B2 is located at input vector component values IVCV1B2 and IVCV2B2 (as indicated by projection IVB2) and at output vector value OVVB2, and training data group value B3 is located at input vector component values IVCV1B3 and IVCV2B3 (as indicated by projection IVB3) and at output vector value OVVB3.

Figure 6D:
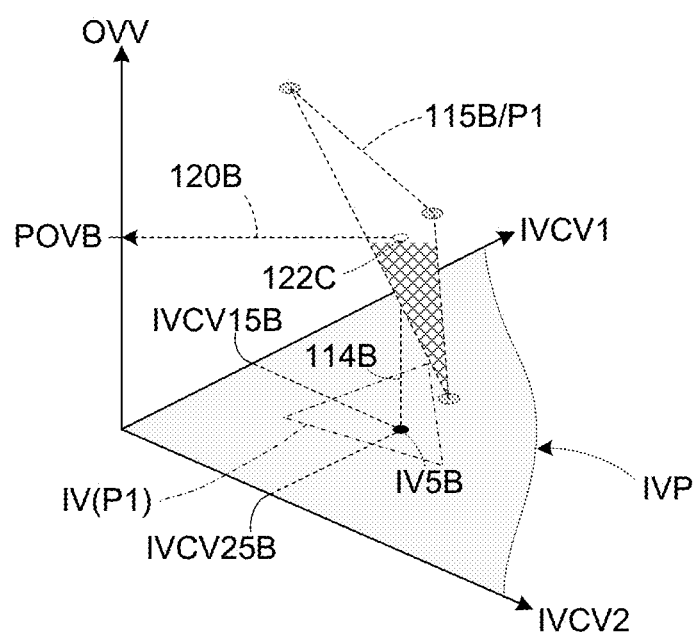

FIG. 6C depicts the utilization of training data group values B1 to B3 to generate a single planar formula/section of piecewise planar prediction function 115B, where the single planar formula is depicted by a triangular planar section P1 passing through and bounded by training data group values B1, B2 and B3. That is, planar section P1 graphically represents a three-dimensional planar formula f(P1) that is operably configured to generate a predicted output vector value for a new input vector value that falls within a multidimensional range IV(P1), which in this example is a triangular region bounded by the input vector projection values IVB1, IVB2 and IVB3, which as described above are defined by training data group values B1, B2, B3. For example, FIG. 6D depicts the use of planar formula f(P1) to generate a predicted output vector value POVB by way of applying a (second) input vector value IV5B defined by input vector component values IVCV15B and IVCV25B, which as indicated in FIG. 6D fall within multidimensional range IV(P1). Specifically, predicted output vector value POVB is generated from applied input vector value IV5B by projecting vertically upward (e.g., along arrow 114B) from the associated position of input vector value IV5B on input vector plane IVP to a corresponding intersection point 122B defined by planar section P1, and then projecting horizontally (e.g., along arrow 120B) from intersection point 122B to a corresponding position on output vector value axis OVV. By merging/averaging multiple training data entries to form training data values/locations B1 to B3, and by utilizing training data values/locations B1 to B3 to generate associated piecewise planar prediction function 115B, the present invention facilitates the generation of sufficiently accurate optimization solutions using substantially less computer processing time than would be required to implement more complex prediction functions.

Figure 7:
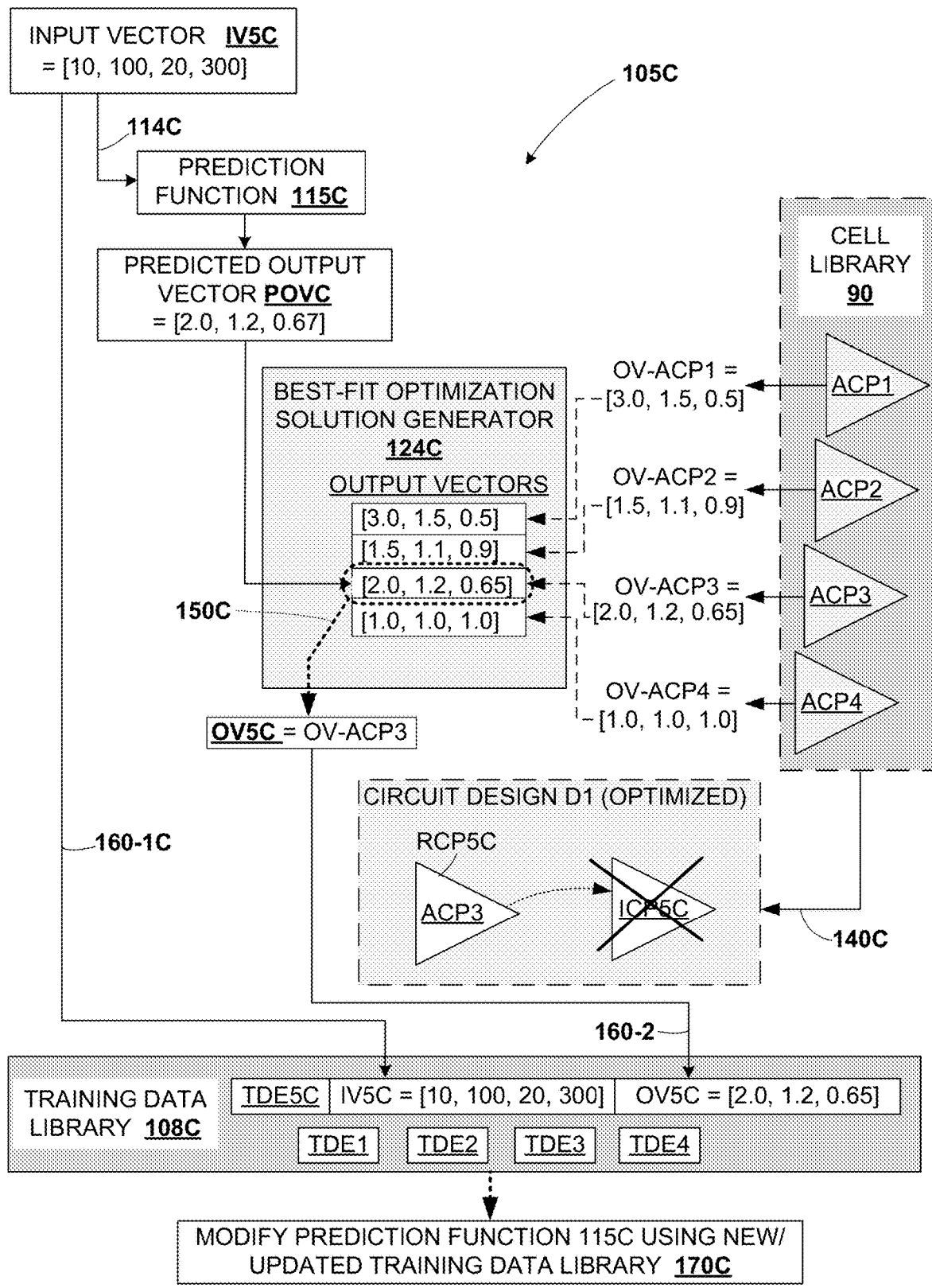
FIG. 7 is a flow diagram depicting the selection of a replacement circuit portion by the machine-learning optimization tool of FIG. 1 according to another exemplary embodiment.

FIG. 7 is a flow diagram depicting the machine-learning optimization methodology of the present invention according to another exemplary embodiment, and in particular shows how optimization solutions generated by a machine-learning optimization tool 105C are utilized to generate new training data. Referring to the top of FIG. 7, a new input vector IV5C is applied to an early (first) version prediction function 115C (as indicated by arrow 114C). In this case, input vector IV5C is arbitrarily characterized as including multiple vector values similar to those described above with refence to FIG. 4A (i.e., SLEW=10, CELL DELAY=100, SLACK=20, FAN-IN SLACK=300). Note that the initial contents of training data library 108C (i.e., training data entries TDE1, TDE2, TDE3 and TDE4) are utilized to generate early version prediction function 115C, e.g., using any of the methods described above. Using the process described above, early version prediction function 115C generates a predicted output vector POVC, which in this example includes output vector values similar to those described above with reference to FIG. 4B (i.e., SLEW CHANGE=2.0, DELAY CHANGE=1.2, POWER CHANGE=0.67). Predicted output vector POVC is then submitted to best-fit optimization solution generator 124C, which compares the output vector values of predicted output vector POVC with output vector values OV-ACP1 to OV-ACP2 of alternative circuit portions ACP1 to ACP4, which are stored in cell library 90 as set forth above. Best-fit optimization solution generator 124C then utilizes predicted output vector POVC to identify alternative circuit portion APC3 as having the associated output vector OV-APC3 that most closely matches predicted output vector POVC, whereby alternative circuit portion APC3 is utilized to serve as replacement circuit portion RCP5C in target circuit design D1, as indicated by arrow 140C in FIG. 7. In addition, as indicated by arrow 150C, machine-learning optimization tool 105C generates an output vector OV5C having output vector values that are identical to output vector OV-APC3 (i.e., SLEW_CHANGE=2.0, DELAY_CHANGE=1.2, POWER_CHANGE=0.65). Training data library 108C is then updated to include a (second) training data entry TDE5C made up of (second) input vector IV5C (i.e., as indicated by arrow 160-1C) that operably characterizes initial circuit portion IPC5C, and associated output vector OV5C (i.e., as indicated by arrow 160-1C) that operably characterizes (second) replacement circuit portion RCP5. Finally, as indicated by block 170C at the bottom of FIG. 7, prediction function 115C is then modified (updated) for use in a subsequent optimization process event using the contents of updated training data library 108C (i.e., the original contents including (first) training data entries TDE1 to TDE4, and the newly entered (second) training data entry TDE5C).

Figure 8:
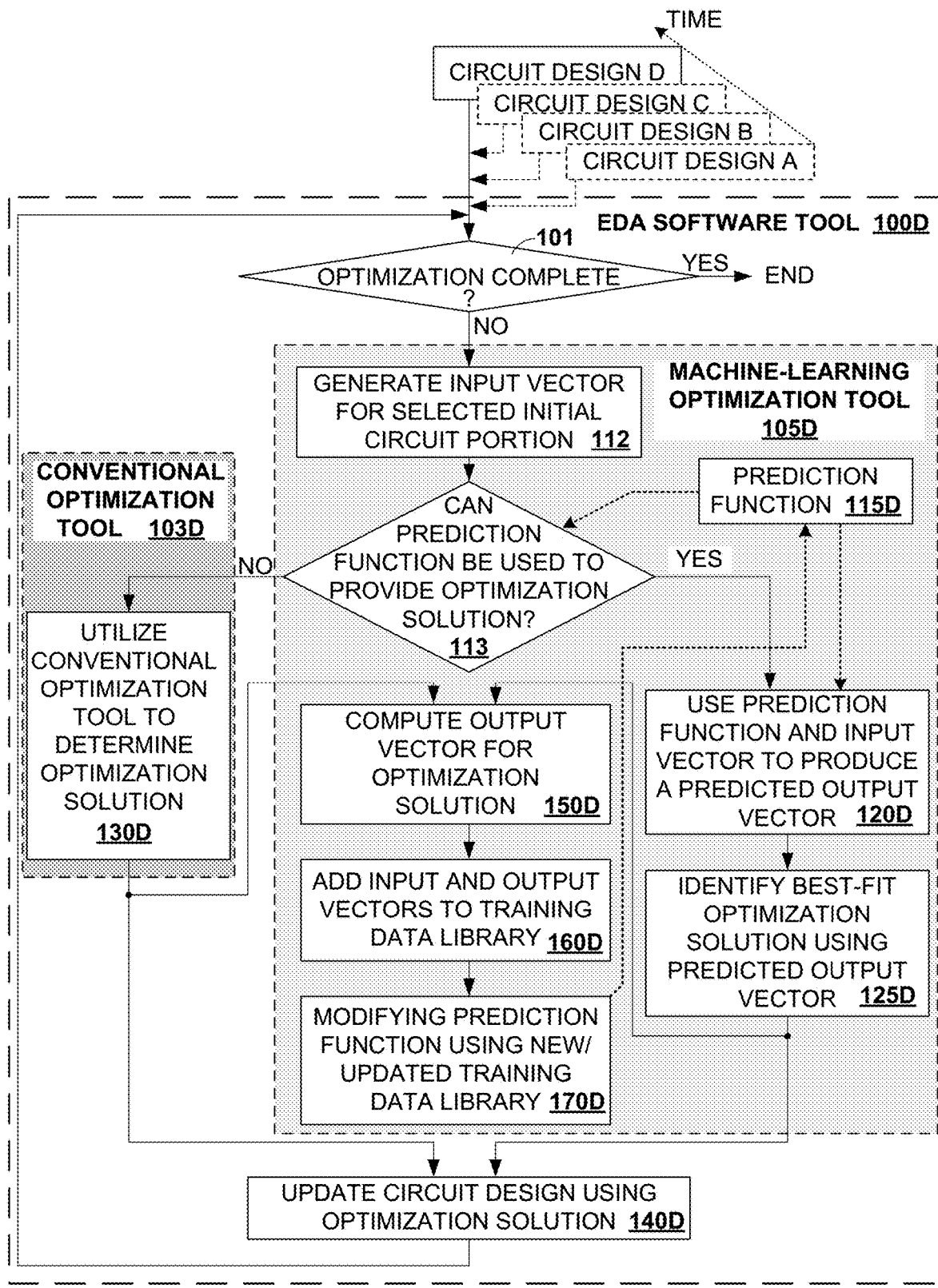
FIG. 8 is simplified block diagram showing an EDA software tool including both a machine-learning optimization tool and a conventional optimization tool according to another embodiment of the present invention.

FIG. 8 is simplified block diagram showing an EDA software tool 100D that utilizes both a machine-learning optimization tool 105D and a conventional optimization tool 103D to according to another embodiment of the present invention. As set forth below, conventional optimization tool 103D is utilized to generate optimization solutions whenever machine-learning optimization tool 105D determines that a prediction function 115D cannot provide a sufficiently accurate optimization solution (e.g., when the enhanced EDA tool 100D is initially implemented on a secure computing system and the training data library (not shown) is relatively empty, or whenever a new input vector falls sufficiently outside the effective range of prediction function 115D such that a boundary function cannot be utilized to generate a reliably accurate predicted output vector).

As indicated at the top of FIG. 8, EDA software tool 100D is utilized over time to perform a series of optimization processes involving different circuit designs A to D. In this example, optimization of circuit designs A, B and C has been completed (indicated by dashed line boxes surrounding these designs), and a current optimization process is performed on circuit design D. Note that optimization solutions generated during previous optimization processes (e.g., those performed on circuit designs A, B and C) have been stored in a training data library (not shown), and machine-learning optimization tool 105D has utilized the stored training data entries to generate a current prediction function 115D in the manner set forth above.

Referring to the upper portion of FIG. 8, the current optimization process is performed until the desired (e.g., power) optimization of circuit design D is complete. While optimization is not completed (no branch from decision block 101), a new initial circuit portion (i.e., similar to initial circuit portions IV5 described above) of circuit design D is selected for replacement, and an input vector (i.e., similar to input vector IV5, described above) is generated for the selected initial circuit portion using the techniques describe above (block 112). Control then passes to decision block 113.

Decision block 113 represents a process of utilizing the new input vector (e.g., IV5) to determine whether prediction function 115D can sufficiently accurately identify a corresponding replacement circuit portion for the corresponding selected first initial circuit portion of target IC design D. This determination is performed, for example, by verifying that the input vector has input vector values that fall within the effective scope of prediction function 115D (e.g., between locations A1 and A5 in FIG. 5D, or within region IV(P1) in FIG. 6C). If the new input vector value falls sufficiently outside the scope of prediction function 115D, then machine-learning optimization tool 105D determines that prediction function 115D will not sufficiently accurately generate a reliable predicted output vector for the new input vector (NO branch from block 113), and control passes to conventional optimization tool 103D, which generates an optimization solution using conventional techniques (block 130D). When the new input vector is sufficiently within the scope of prediction function 115D, then machine-learning optimization tool 105D determines that prediction function 115D will sufficiently accurately generate a reliable predicted output vector (i.e., identify a corresponding replacement circuit portion) for the new input vector, and control passes along the YES branch from block 113 to block 120D. In block 120D, prediction function 115D is utilized as described above to generate a predicted output vector (POV) based on the new input vector (e.g., IV5), and then an optimization solution is generated using the predicted output vector, for example, using the best-fit techniques described above (block 125D).

Referring to block 140D at the lower portion of FIG. 8, target IC design D is then updated to replace the corresponding selected initial circuit portion (e.g., portion ICP5 in the examples provided above) with a corresponding replacement circuit portion (e.g., portion RCP5 in the examples provided above). Note that the circuit design update process is performed using either an optimization solution generated by machine-language optimization tool 105D, or an optimization solution generated by conventional optimization tool 103D.

Referring now to blocks 150D to 170D located near the center of FIG. 8, the optimization solution for the new input vector, whether generated by both machine-language optimization tool 105D or by conventional optimization tool 103D, is utilized to update prediction function 115D by way of being utilized as a new (second) training data entry that operably characterizes both the selected initial circuit portion and corresponding replacement circuit portion associated with the just-performed optimization process event. Specifically, the optimization solution is utilized to generate a new output vector that operably characterizes the replacement circuit portion (block 150D), the training data library (e.g. library 108, FIG. 1) is updated to include a new training data entry including the new input and output vectors (block 160D), and then the updated training data library is utilized to generate an updated (modified) version of prediction function 115D (block 170D).

As set forth by the examples described above, there are three steps in the active machine learning in the invention: 1) Active learning: In this step, the machine learning based optimization software learns optimization moves (optimization solutions) such as gate sizing, moving cells and buffer insertions, which the software has not seen before; 2) Training data generation: In this step, the software writes training data to a file (e.g., a library); and 3) Optimization with training data: In this step, the software reads the previously generated training data, trains itself, and uses the new machine learning technique to optimize power with much faster runtime.

Technology Specific EDA System/Workflow Explanation

Figure 9:
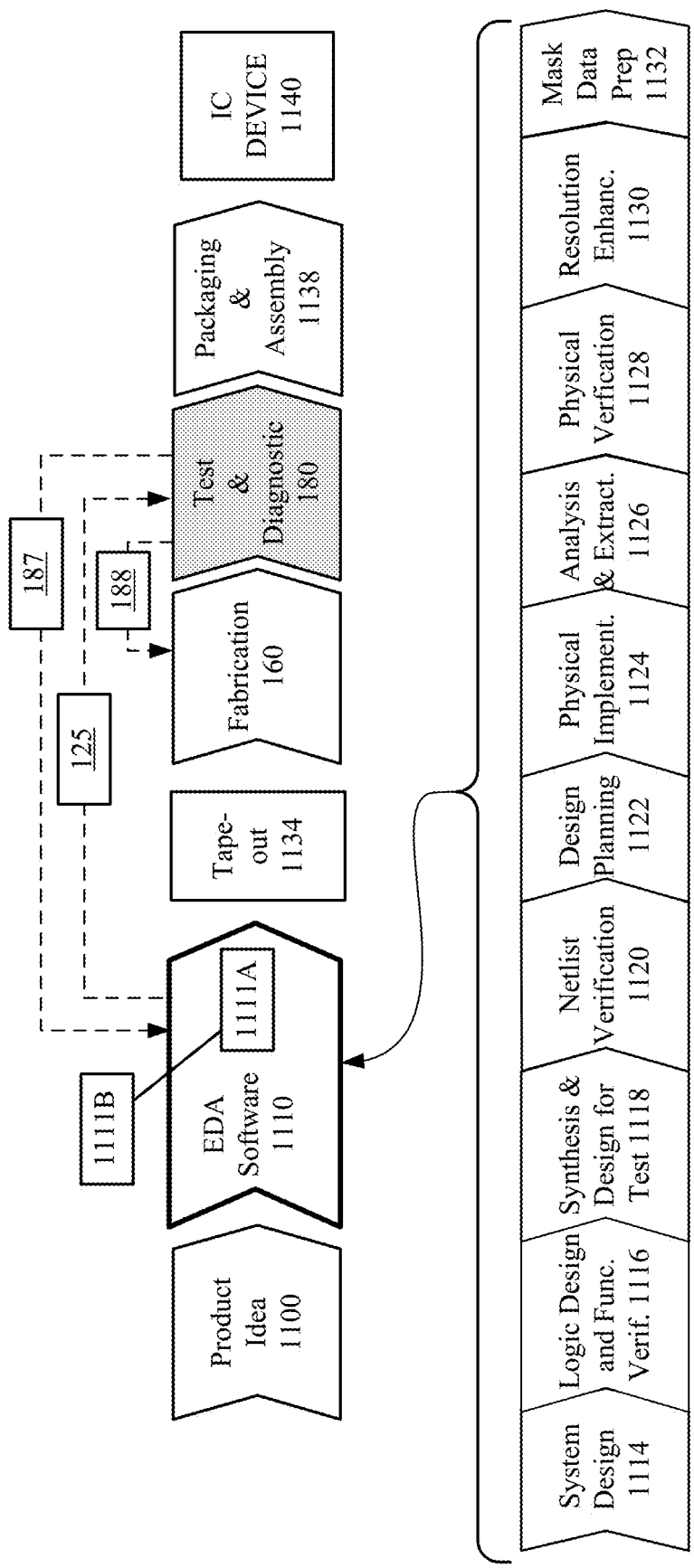
FIG. 9 is a flowchart illustrating various operations in the design and fabrication of an integrated circuit in accordance with an embodiment of the present disclosure.

FIG. 9 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. When a circuit design is finalized, it is typically taped-out (1134), and then multiple ICs, each being a physical implementation of the final circuit design, are fabricated on a semiconductor wafer (160) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1110) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part USB PHY configuration of the present invention are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. In one embodiment, the machine-learning optimization tool/method described herein may be utilized during netlist verification.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products. In one embodiment, the machine-learning optimization tool/method described herein may be utilized during analysis and extraction.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilinx or Altera), Random Access Memories (RAMS) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 10B:
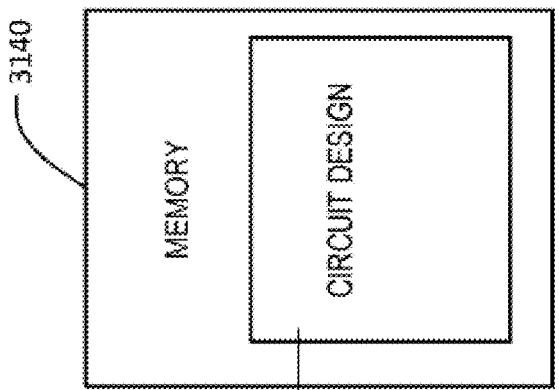
FIGS. 10A, 10B and 10C are simplified block diagrams of a computer system suitable for use with embodiments of the technology, as well as circuit design and circuit embodiments of the technology.
Figure 10C:
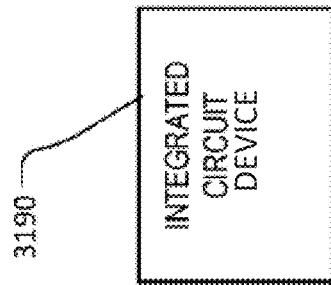
Figure 10A:
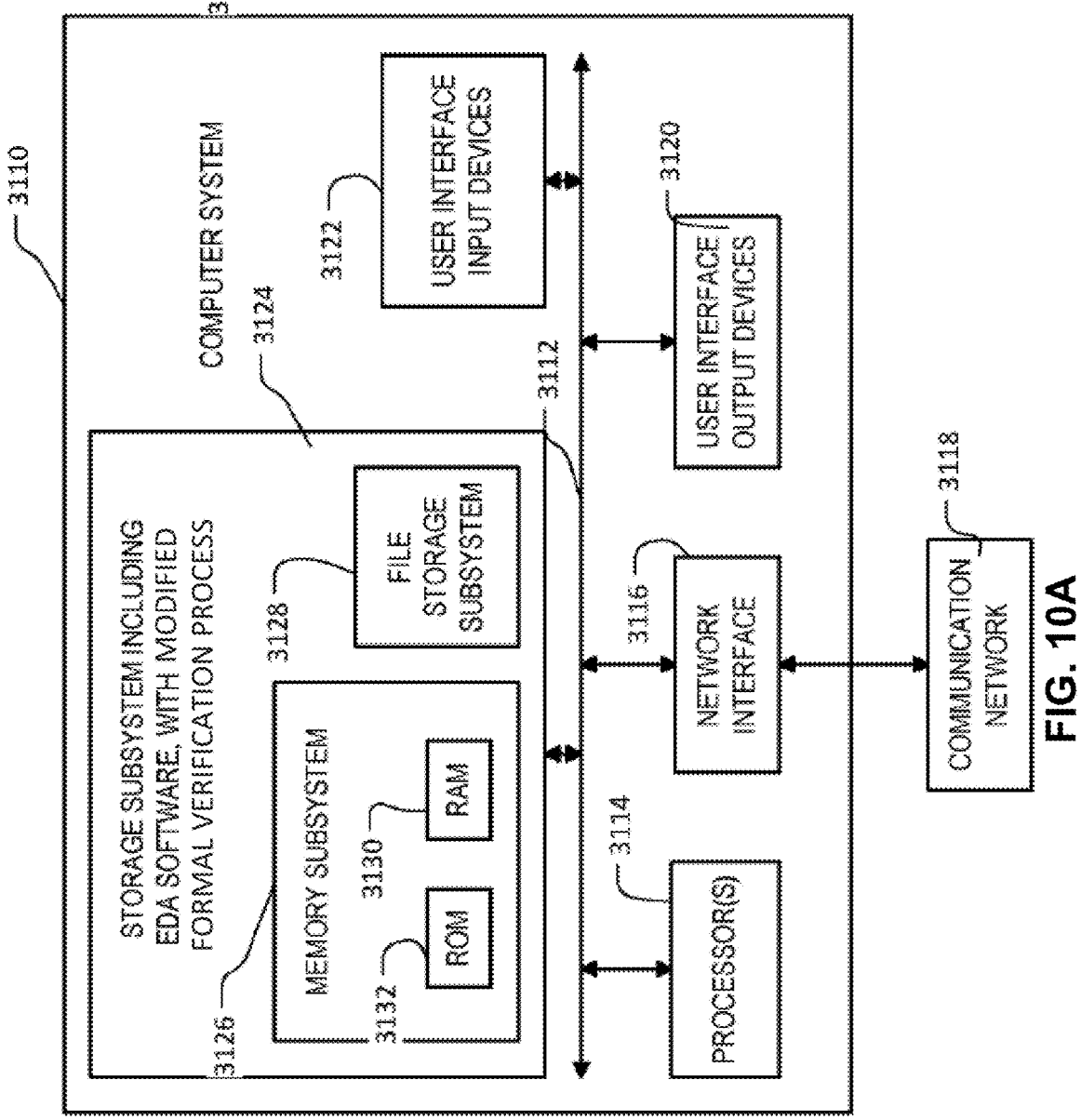
Figure 11:
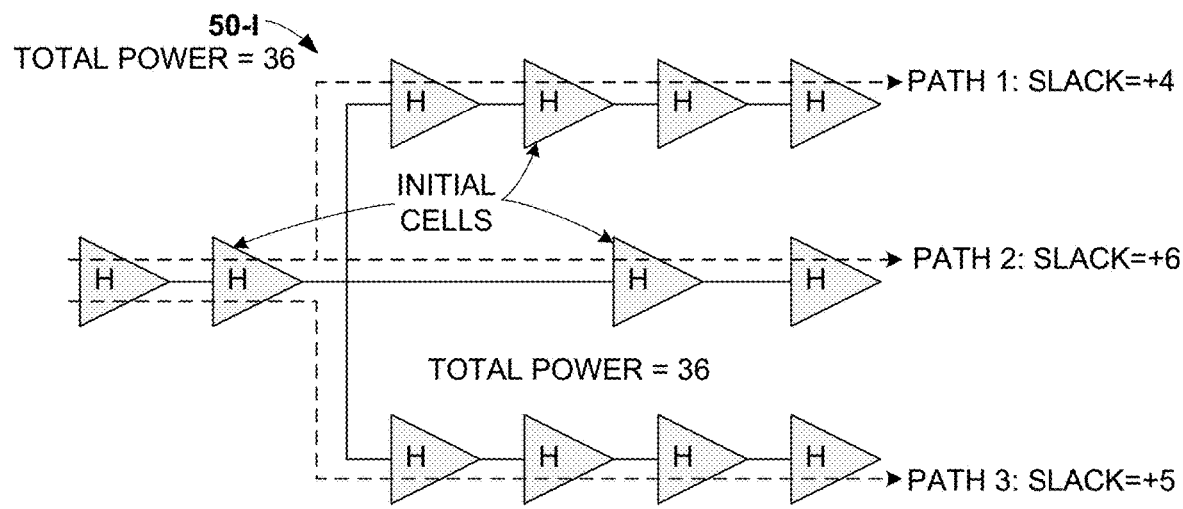
FIG. 11 is a diagram depicting a simplified conventional IC design prior to optimization.
Figure 12:
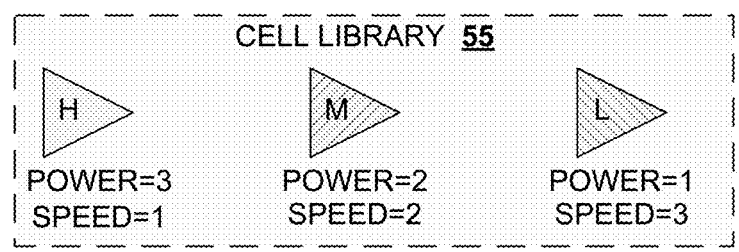
FIG. 12 is a diagram depicting alternative circuit portions that may be optionally utilized to optimize the IC design of FIG. 11.
Figure 13:
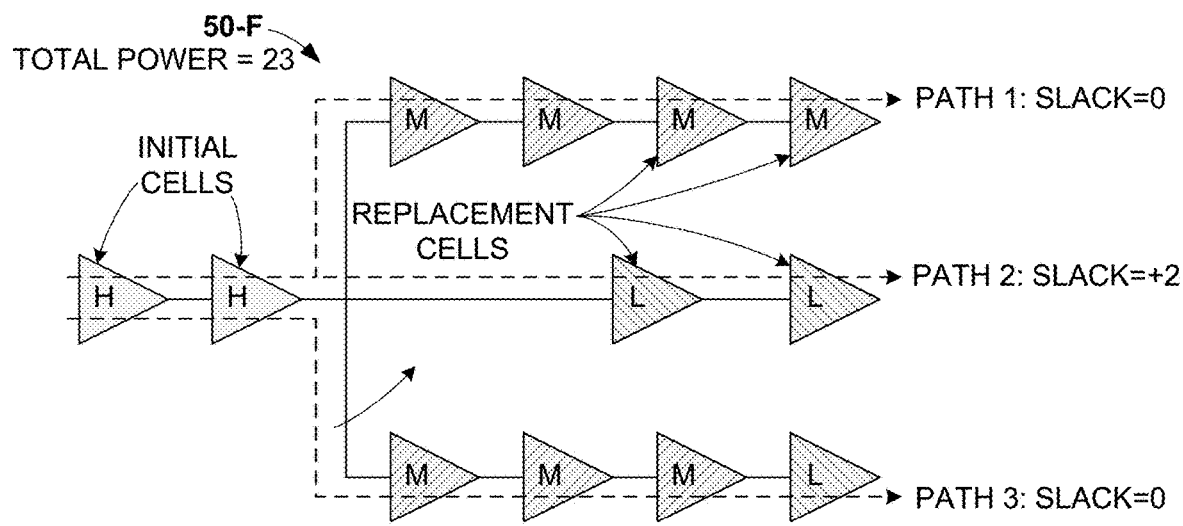
FIG. 13 is a diagram depicting an optimized version of the IC design of FIG. 11.

FIGS. 10A, 10B and 10C are simplified block diagrams of a computer system suitable for generating and verifying circuit designs using the multidimensional constraint solver of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store the various tools, libraries and other data utilized during execution of the machine-learning optimization method described herein. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the machine-learning optimization tools described herein, computer system 3110 depicted in FIG. 10A represents an electronic structure suitable for creating a circuit design. FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 10C is a block representing an IC 3190 designed and fabricated in accordance with the processes described above, where circuit 3190 is fabricated in accordance with the circuit design of data structure 3180 (see FIG. 10B).

The foregoing detailed description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. An electronic design automation (EDA) tool in a computer, the EDA tool including instructions stored on a non-transitory computer-readable medium such that, when executed by a processor of said computer, cause the processor to perform operations comprising:

generating a prediction function using a plurality of quantized first training data entries corresponding to previously generated optimization solutions, where each quantized first training data entry includes a corresponding first input vector including first input vector values that operably characterize a corresponding first initial circuit portion of an associated said previously generated optimization solution, and a corresponding first output vector including one or more first output vector values that operably characterize a corresponding first replacement circuit portion of said associated previously generated optimization solution;

utilizing the prediction function to generate a predicted output vector for a second initial circuit portion by applying a second input vector to said prediction function, said second input vector including second input vector values that operably characterize said second initial circuit portion, and said predicted output vector including one or more second output vector values; and utilizing the one or more second output vector values of the predicted output vector to select a second replacement circuit portion from a group of alternative circuit portions, each said alternative circuit portion including one or more corresponding third output vector values, wherein selecting said second replacement circuit portion includes determining an optimal circuit portion of said alternative circuit portions having corresponding one or more said third output vector values that most closely match said one or more second output vector values of said predicted output vector.

2. The EDA tool of claim 1, wherein generating the prediction function comprises generating at least some of said previously generated optimization solutions using a conventional optimization tool, and then generating said quantized first training data entries using said at least some of said previously generated optimization solutions.

3. The EDA tool of claim 2, wherein generating quantized first training data entries comprises generating input vectors operably describing initial circuit components that were replaced during associated said previously generated optimization solutions, and generating output vectors operably describing replacement circuit components that replaced corresponding initial circuit components during said associated previously generated optimization solutions.

4. The EDA tool of claim 1, wherein said first input vector values of said corresponding first input vector of said each quantized first training data entry includes an initial power consumption value that operably characterizes power consumption by said first initial circuit portion of said previously generated optimization solution, and said one or more first output vector values of said corresponding first output vector operably characterize a final power consumption of said corresponding first replacement circuit portion of said associated previously generated optimization solution.

5. The EDA tool of claim 4, wherein said first input vector values of said corresponding first input vector further comprises at least one timing value that operably characterizes timing characteristics of said first initial circuit portion, and said one or more first output vector values of said corresponding first output vector operably characterize a final timing characteristic of said corresponding first replacement circuit portion of said associated previously generated optimization solution.

6. The EDA tool of claim 1, wherein generating the prediction function comprises:

organizing said plurality of quantized first training data entries into a plurality of training data groups such that each said training data group includes a corresponding portion of said quantized first training data entries;

calculating a training data group value for each said training data group, wherein each said training data group value includes an associated average input vector value that is calculated using said first input vector values of said multiple training data entries in said each training data group, and wherein each training data group value also includes an associated average output vector value that is calculated using said first output vector values of said multiple training data entries in said each training data group; and utilizing said training data group values to generate said prediction function.

7. The EDA tool of claim 6, wherein utilizing said training data group values to generate said prediction function comprises generating a plurality of linear formulas, each said linear formula being configured to generate said predicted output vector value for said second input vector value when said second input vector value is between an associated pair of component input vector values defined by said associated pair of training data group values.

8. The EDA tool of claim 7, wherein said each linear formula includes a slope calculated by dividing a difference between an associated pair of component output vector values—by a difference between said associated pair of component input vector values, wherein said associated pair of component output vector values—are respectively defined by said associated pair of training data group values.

9. The EDA tool of claim 6, wherein utilizing said training data group values to generate said prediction function comprises generating at least one multidimensional planar formula, said multidimensional planar formula being configured to generate said predicted output vector value for said second input vector value when said second input vector value is within a multidimensional range bounded by component input vector values defined by three or more of said training data group values.

10. The EDA tool of claim 1, wherein the plurality of quantized first training data entries are stored in a training data library, and wherein the operations further comprise updating the training data library to include a second training data entry comprising said second input vector and an associated output vector that operably characterizes said selected second replacement circuit portion.

11. The EDA tool of claim 10, wherein the operations further comprise modifying said prediction function using said plurality of quantized first training data entries and said second training data entry.

12. The EDA tool of claim 1, wherein the operations further comprise updating a target IC design by replacing said selected initial circuit portion of said target IC design with said corresponding first replacement circuit portion.

13. An apparatus, comprising: a processor; and a non-transitory computer-readable storage medium storing instructions that, when executed by the processor, cause the processor to perform operations comprising:

generating a prediction function using a plurality of quantized first training data entries corresponding to previously generated optimization solutions, where each quantized first training data entry includes a corresponding first input vector including first input vector values that operably characterize a corresponding first initial circuit portion of an associated said previously generated optimization solution, and a corresponding first output vector including one or more first output vector values that operably characterize a corresponding first replacement circuit portion of said associated previously generated optimization solution;

utilizing the prediction function to generate a predicted output vector for a second initial circuit portion by applying a second input vector to said prediction function, said second input vector including second input vector values that operably characterize said second initial circuit portion, and said predicted output vector including one or more second output vector values; and utilizing the one or more second output vector values of the predicted output vector to select a second replacement circuit portion from a group of alternative circuit portions, each said alternative circuit portion including one or more corresponding third output vector values, wherein selecting said second replacement circuit portion includes determining an optimal circuit portion of said alternative circuit portions having corresponding one or more said third output vector values that most closely match said one or more second output vector values of said predicted output vector.

* * * * *